United States Patent
Werner et al.

(10) Patent No.: US 10,745,019 B2
(45) Date of Patent: Aug. 18, 2020

(54) AUTOMATIC AND PERSONALIZED CONTROL OF DRIVER ASSISTANCE COMPONENTS

(71) Applicant: International Business Machines Corporation, Armonk, NY (US)

(72) Inventors: John S. Werner, Fishkill, NY (US); Luke N. Buschmann, New Paltz, NY (US); Brad Hoover, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 316 days.

(21) Appl. No.: 15/844,713

(22) Filed: Dec. 18, 2017

(65) Prior Publication Data
US 2019/0185009 A1     Jun. 20, 2019

(51) Int. Cl.
*B60W 40/09* (2012.01)
*G06N 10/00* (2019.01)
(Continued)

(52) U.S. Cl.
CPC ............ *B60W 40/09* (2013.01); *B60W 40/12* (2013.01); *B60W 50/0097* (2013.01);
(Continued)

(58) Field of Classification Search
CPC .. B60W 40/09; B60W 40/12; B60W 50/0097; B60W 2050/0089; G06N 20/20; G06N 5/022; G06N 7/005
See application file for complete search history.

(56) References Cited

U.S. PATENT DOCUMENTS

| 8,725,311 B1 * | 5/2014 | Breed | A61B 5/163 |
| | | | 701/1 |
| 9,623,878 B2 * | 4/2017 | Tan | B60W 50/0098 |

(Continued)

FOREIGN PATENT DOCUMENTS

| CN | 101030316 A | 9/2007 |
| CN | 106627589 A | 5/2017 |
| JP | 2008068664 A | 3/2008 |

OTHER PUBLICATIONS

Zhu, "Semi-Supervised Learning Tutorial," International Conference on Machine Learning (ICML), 2007, 156 pages.

*Primary Examiner* — Courtney D Heinle
(74) *Attorney, Agent, or Firm* — Cantor Colburn LLP; Teddi Maranzano

(57) ABSTRACT

Embodiments are directed to a computer-implemented method of operating a driver assistance component (DAC) of a vehicle. The method includes receiving sensed operator state data and sensed vehicle state data that represents a vehicle state of the vehicle. Based at least in part on the sensed operator state data, an operator state model is created, trained, and updated. Based at least in part on the sensed vehicle state data, a vehicle state model is created, trained, and updated. Based at least in part on new sensed operator state data, an operator state model classification output is created. Based at least in part on new sensed vehicle state data, a vehicle state model classification output is created. The operator state model classification output and the vehicle state model classification output are correlated, and operating parameters for the DAC are predicted.

17 Claims, 7 Drawing Sheets

(51) Int. Cl.
*B60W 40/12* (2012.01)
*B60W 50/00* (2006.01)
*G06N 5/02* (2006.01)
*G06N 7/00* (2006.01)
*G06N 20/20* (2019.01)

(52) U.S. Cl.
CPC .............. *G06N 5/022* (2013.01); *G06N 7/005* (2013.01); *G06N 20/20* (2019.01); *B60W 2050/0089* (2013.01)

(56) References Cited

U.S. PATENT DOCUMENTS

| | | | |
|---|---|---|---|
| 2013/0054090 A1* | 2/2013 | Shin | B60K 28/06 701/36 |
| 2015/0053066 A1* | 2/2015 | Hampiholi | B60W 50/14 84/602 |
| 2017/0181684 A1* | 6/2017 | Lian | A61B 3/113 |
| 2017/0369073 A1* | 12/2017 | Huber | B60W 50/0098 |
| 2018/0053102 A1* | 2/2018 | Martinson | B60R 16/0232 |

* cited by examiner

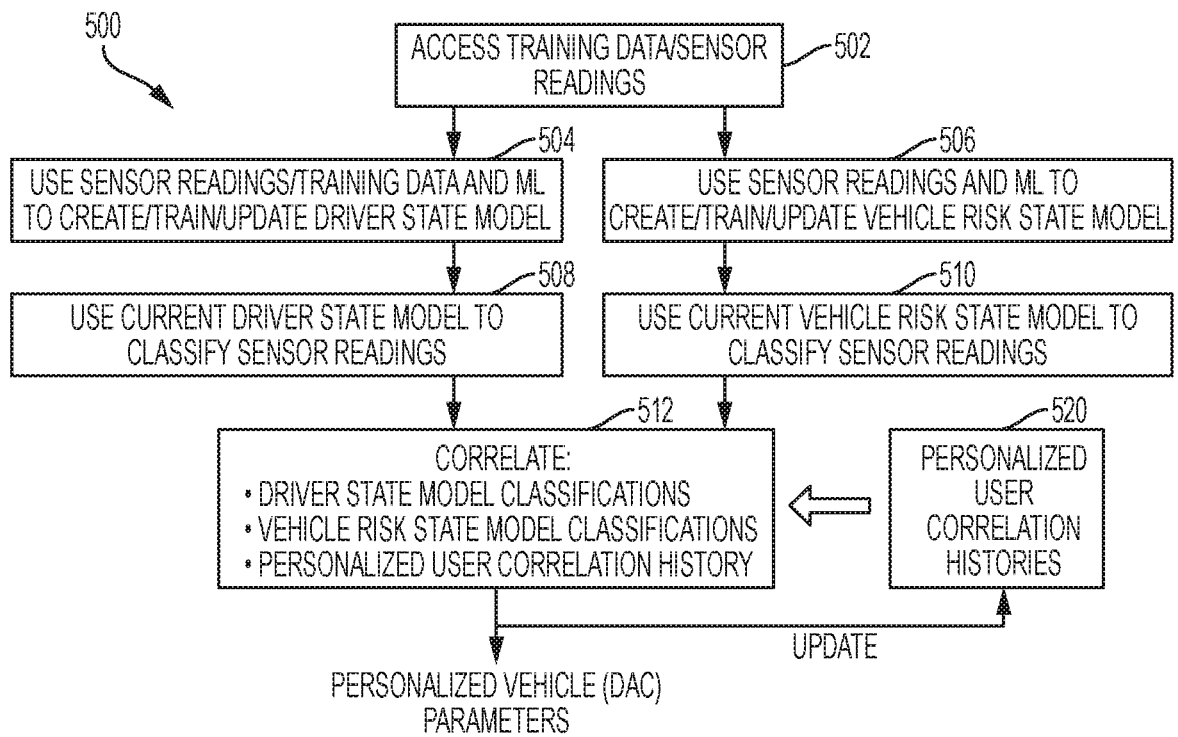

FIG. 5

| DRIVER STATE MODEL OUTPUT | DRIVER A DRIVING PATTERN CORRELATION | DRIVER B DRIVING PATTERN CORRELATION | DRIVER C DRIVING PATTERN CORRELATION | DRIVER D DRIVING PATTERN CORRELATION |
|---|---|---|---|---|
| GRIP ON WHEEL TIGHTENS > THRESHOLD | AVERAGE DRIVING SPEED INCREASES | NO CHANGE | AVERAGE DRIVING SPEED DECREASES | LANE POSITION UNSTABLE |
| BLUE TOOTH ACTIVE FOR A PHONE CALL | BRAKING FORCE INCREASES | NO CHANGE | LANE POSITION UNSTABLE | BRAKING FORCE INCREASES |
| DRIVER MOOD = "ANGRY" | BRAKING FORCE INCREASES | NO CHANGE | BRAKING FORCE INCREASES | AVERAGE DRIVING SPEED INCREASES |
| MULTIPLE HUMAN, NON-RADIO VOICES | AVERAGE DRIVING SPEED INCREASES | NO CHANGE | LANE POSITION UNSTABLE | BRAKING FORCE INCREASES |

FIG. 6

AUTOMATIC AND PERSONALIZED CONTROL OF DRIVER ASSISTANCE COMPONENTS

BACKGROUND

The present invention relates in general to driver assistance components of a vehicle. More specifically, the present invention relates to methods, systems and computer program products for the automatic and personalized control of the operating parameters of a vehicle's driver assistance components.

Vehicles can include a variety of so-called driver assistance components, which are designed to assist with various aspects of operating a vehicle. In automobiles, examples of driver assistance components include brake assist systems, forward-collision warning systems, automatic emergency braking systems, adaptive cruise control systems, blind-spot warning systems, rear cross-traffic alert systems, lane-departure warning systems, lane-keeping assist systems, pedestrian detection systems, and the like.

In addition to driver assistance components, automobiles also include an on-board diagnostics (OBD) module, which can communicate with various vehicle sensors through a specialized in-vehicle communications network often referred to as a vehicle bus. An OBD module is a computer-based system that monitors the performance of major engine components of an automobile. A basic OBD system includes an electronic control unit (ECU), which uses input from various sensors (e.g., oxygen sensors) to control various vehicle actuators (e.g., fuel injectors) in order to reach a desired level of vehicle performance.

SUMMARY

Embodiments of the invention are directed to a computer-implemented method of operating a driver assistance component (DAC) of a vehicle. The method includes receiving, using a sensor system, sensed operator state data that represents an operator state of a vehicle operator in an interior passenger cabin of the vehicle, wherein the sensed operator state data is gathered only when the vehicle is being operated by the operator. The method further includes receiving, using the sensing system, sensed vehicle state data that represents a vehicle state of the vehicle, wherein the sensed vehicle state data is gathered only when the vehicle is being operated by the operator. Based at least in part on the sensed operator state data, a first classifier is used to create, train, and update an operator state model, wherein the operator state model is exclusive to when the vehicle is being operated by the operator. Based at least in part on the sensed vehicle state data, a second classifier is used to create, train, and update a vehicle state model, wherein the vehicle state model is exclusive to when the vehicle is being operated by the operator. Based at least in part on new sensed operator state data, the first classifier and the operator state model are used to generate an operator state model classification output. Based at least in part on new sensed vehicle state data, the second classifier and the vehicle state model are used to generate a vehicle state model classification output. A correlation engine is used to generate the operator state model classification output and the vehicle state model classification output. Based at least in part on the operator state model classification output and the vehicle state model classification output, a predictor engine is used to predict operator parameters for the DAC of the vehicle.

Additional embodiments of the invention are directed to a computer system and a computer program product having corresponding to the features of the computer-implemented method described above.

Additional features and advantages are realized through the techniques described herein. Other embodiments and aspects are described in detail herein. For a better understanding, refer to the description and to the drawings.

BRIEF DESCRIPTION OF THE DRAWINGS

The subject matter which is regarded as the present invention is particularly pointed out and distinctly claimed in the claims at the conclusion of the specification. The foregoing and other features and advantages are apparent from the following detailed description taken in conjunction with the accompanying drawings in which:

FIG. 5 depicts a flow diagram illustrating a methodology according to one or more embodiments of the present invention;

FIG. 6 depicts a table illustrating examples of correlations between driver state model outputs and the correlated change in driving pattern for various drivers according to embodiments of the present invention;

Figure 1:
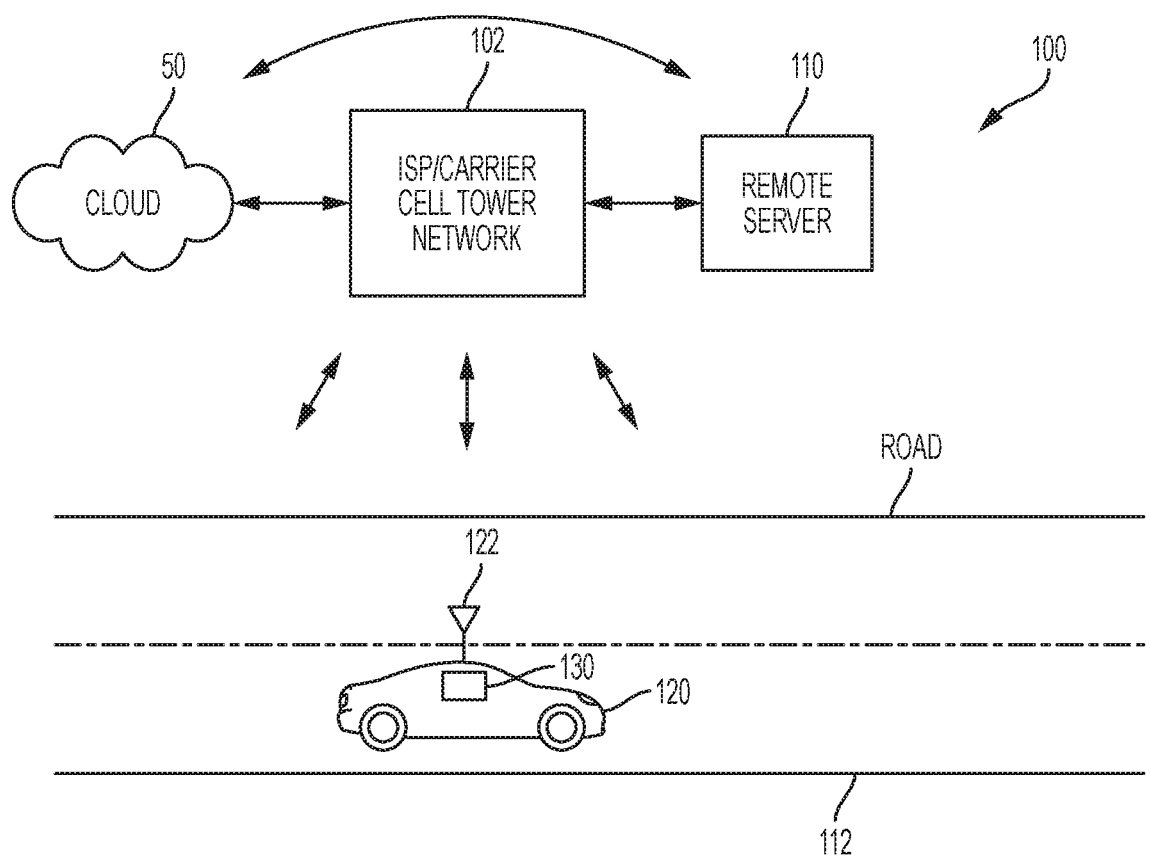
FIG. 1 depicts a block diagram of a system embodying aspects of the present invention.

In the accompanying figures and following detailed description of the disclosed embodiments, the various elements illustrated in the figures are provided with two, three or four digit reference numbers. In most instances, the leftmost digit(s) of each reference number corresponds to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, a process, a method, an article, or an apparatus that comprises a list of elements is not necessarily limited to only those elements but can include other elements not expressly listed or inherent to such composition, mixture, process, method, article, or apparatus.

Additionally, the term "exemplary" and variations thereof are used herein to mean "serving as an example, instance or illustration." Any embodiment or design described herein as "exemplary" is not necessarily to be construed as preferred or advantageous over other embodiments or designs. The terms "at least one," "one or more," and variations thereof, can include any integer number greater than or equal to one, i.e. one, two, three, four, etc. The terms "a plurality" and variations thereof can include any integer number greater than or equal to two, i.e., two, three, four, five, etc. The term "connection" and variations thereof can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The terms "vehicle," "car," "automobile," and variations thereof can be used interchangeably herein and can refer to a device or structure for transporting animate and/or inanimate or tangible objects (e.g., persons and/or things), such as a self-propelled conveyance. A vehicle as used herein can include any conveyance or model of a conveyance, where the conveyance was originally designed for the purpose of moving one or more tangible objects, such as people, animals, cargo, and the like. The term "vehicle" does not require that a conveyance moves or is capable of movement. Typical vehicles include but are not limited to cars, trucks, motorcycles, busses, automobiles, trains, railed conveyances, boats, ships, marine conveyances, submarine conveyances, airplanes, space craft, flying machines, human-powered conveyances, and the like.

The term "bus" and variations thereof, as used herein, can refer to a subsystem that transfers information and/or data between various components. A bus generally refers to the collection communication hardware interface, interconnects, bus architecture, standard, and/or protocol defining the communication scheme for a communication system and/or communication network. A bus can also refer to a part of a communication hardware that interfaces the communication hardware with interconnects that connect to other components of the corresponding communication network. The bus can be for a wired network, such as a physical bus, or wireless network, such as part of an antenna or hardware that couples the communication hardware with the antenna. A bus architecture supports a defined format in which information and/or data is arranged when sent and received through a communication network. A protocol can define the format and rules of communication of a bus architecture.

The phrases "communication device," "smartphone," "mobile device," and variations thereof, can be used interchangeably herein and can include any type of device capable of communicating with one or more of another device and/or across a communications network, via a communications protocol, and the like. Exemplary communication devices include but are not limited to smartphones, handheld computers, laptops, netbooks, notebook computers, subnotebooks, tablet computers, scanners, portable gaming devices, phones, pagers, and other network-connected devices.

The phrases "communications system," "communications network," and variations thereof, as used herein, can refer to a collection of communication components capable of one or more of transmission, relay, interconnect, control, or otherwise manipulate information or data from at least one transmitter to at least one receiver. As such, the communication can include a range of systems supporting point-to-point or broadcasting of the information or data. A communications system can refer to the collection individual communication hardware as well as the interconnects associated with and connecting the individual communication hardware. Communication hardware can refer to dedicated communication hardware or can refer a processor coupled with a communication means (i.e., an antenna) and running software capable of using the communication means to send and/or receive a signal within the communication system. Interconnect refers to some type of wired or wireless communication link that connects various components, such as communication hardware, within a communication system.

The phases "infotainment," "infotainment system," "in-vehicle infotainment system," and variations thereof, as used herein, are used interchangeably and can refer to the hardware/software products, data, content, information, and/or systems, which can be built into or added to vehicles to enhance driver and/or passenger experience. The phrase "infotainment systems" includes systems having the capability to access the internet to deliver entertainment and information content inside the vehicle. Infotainment systems can utilize Bluetooth technology, Wi-Fi technologies, cellular data technologies such as 4G LTE, and/or smartphones to help drivers/users control the system with voice commands, touch-screen input, or physical controls. Typical tasks performed by infotainment system include managing and playing audio content, utilizing navigation for driving, delivering rear-seat entertainment such as movies, games, social networking, etc., listening to incoming and sending outgoing SMS text messages, making phone calls, and accessing internet-enabled or smartphone-enabled content such as traffic conditions, sports scores and weather forecasts.

The phrases "in communication with," "communicatively coupled to," and variations thereof can be used interchangeably herein and can refer to any coupling, connection, or interaction using electrical signals to exchange information or data, using any system, hardware, software, protocol, or format, regardless of whether the exchange occurs wirelessly or over a wired connection.

Turning now to an overview of technologies that are relevant to aspects of the present invention, in-vehicle networking (also known as multiplexing) is a method of transferring data among distributed vehicle components via a serial data bus. In-vehicle networking enables automobiles to be equipped with hundreds of computer-based electronic components and controls, including, for example, sensors, circuits, modules, components, and the like. Without serial networking, inter-module communication would require dedicated, point-to-point wiring, which would result in bulky, expensive, complex, and difficult to install wiring harnesses. Applying a serial data bus reduces the number of wires by combining the signals on a single wire through time division multiplexing.

Using in-vehicle networking is an enabler for allowing automobiles to be equipped with a variety of so-called driver assistance components (DACs), which are designed to assist with various aspects of operating the vehicle. Examples of DACs include brake assist systems, forward-collision warning (FCW) systems, automatic emergency braking (AEB) systems, adaptive cruise control systems, blind-spot warning (BSW) systems, rear cross-traffic alert systems, lane-departure warning (LDW) systems, lane-keeping assist (LKA) systems, pedestrian detection systems, and the like. Embodiments of the present invention are directed to methods, systems and computer program products for the automatic and personalized adjustment of DACs in a vehicle.

Turning now to an overview of the present invention, one or more embodiments of the invention provide methods, systems, and computer program products for the automatic and personalized control of the operating parameters of a vehicle's DAC system. Embodiments of the invention gather a variety of driver state sensed data and vehicle state sensed data, which is used to train a configuration of supervised and unsupervised machine learning classifiers. Embodiments of the invention selectively direct some sensed training data to supervised classifiers and direct other sensed training data to unsupervised classifiers to create/train/update driver state models and vehicle risk state models. The driver state models are used to classify sensed driver state data, and the vehicle risk state models are used to classify sensed vehicle state data. A machine learning correlation engine can be used to correlate the driver state classifications, the vehicle risk state classifications, and a personalized user correlation history. The machine learning correlation engine updates a database that holds the personalized user correlation histories, and also performs a risk prediction operation on the current user/driver state against the results of the correlation to predict a predicted potential risk for the user/driver at the current time. This predicted potential risk is used to adjust appropriate operating parameter(s) of selected DACs in a vehicle.

In embodiments of the invention, the supervised and unsupervised machine learning classifiers are configured and arranged to apply machine learning techniques to the driver state sensed data in order to, over time, create/train/update a unique and personalized driver state model for each driver of the vehicle. For example, when the initial owner first starts and drives the vehicle, sensed driver state data (e.g., from a camera) can be utilized to detect a first-time driver and create a new profile (e.g., Driver A Profile) for the first-time driver. The initial owner, Driver A, drives the vehicle home, and all driver sensed data during that trip is utilized to create/train/update a Driver A State Model for the Driver A Profile. In embodiments of the invention, the supervised and unsupervised machine learning classifiers are configured and arranged to only create/train/update a driver's model when the supervised and unsupervised machine learning classifiers have confirmed through a sensor system that the driver that is associated with that driver state model is operating the vehicle. Accordingly, for a family in which 4 people, namely Driver A, Driver B, Driver C, and Driver D, drive the vehicle, the supervised and unsupervised machine learning classifiers, according to embodiments of the invention, will create/train/update a separate, personalized, and individual driver state model for each of Driver A, Driver B, Driver, C, and Driver D.

Turning now to a more detailed description of embodiments of the present invention, FIG. 1 depicts a diagram illustrating a system 100 embodying aspects of the present invention. System 100 includes a vehicle 120 traveling on a road 112, an ISP/carrier cell tower network 102, a remote sever 110, and a cloud computing system 50, configured and arranged as shown. The vehicle 120 includes an antenna system 122 and a vehicle electronics system 130, configured and arranged as shown. Vehicle electronics system 130 includes sufficient processing power to gather, store, map, and analyze operating data, time data, and miles data of the vehicle 120 according to embodiments of the present invention. In one or more embodiments, vehicle electronics system 130 gathers, stores, and maps operating/time/miles data of the vehicle 120, and then transmits the mapped operating/time/miles data, using antenna system 122, through cell tower network 102 to either cloud computing system 50 or remote server 110 for analysis. In one or more embodiments, vehicle electronics system 130 gathers and stores operating/time/miles data of the vehicle 120, and then transmits the stored operating/time/miles data, using antenna system 122, through cell tower network 102 to either cloud computing system 50 or remote server 110 for mapping and analysis. Additional details of vehicle electronics system 130 are illustrated by a vehicle electronics control system 130A, which is shown in FIG. 2 and described in greater detail later in this detailed description.

Cloud computing system 50 is in wired or wireless electronic communication with one or all of remote server 110, cell tower network 102, antenna system 122, and vehicle electronics system 130. Cloud computing system 50 can supplement, support, or replace some or all of the functionality of remote server 110, cell tower network 102, antenna system 122, and vehicle electronics system 130. Additionally, some or all of the functionality of remote server 110, cell tower network 102, antenna system 122, and vehicle electronics system 130 can be implemented as a node 10 (shown in FIG. 7) of cloud computing system 50.

Figure 2:
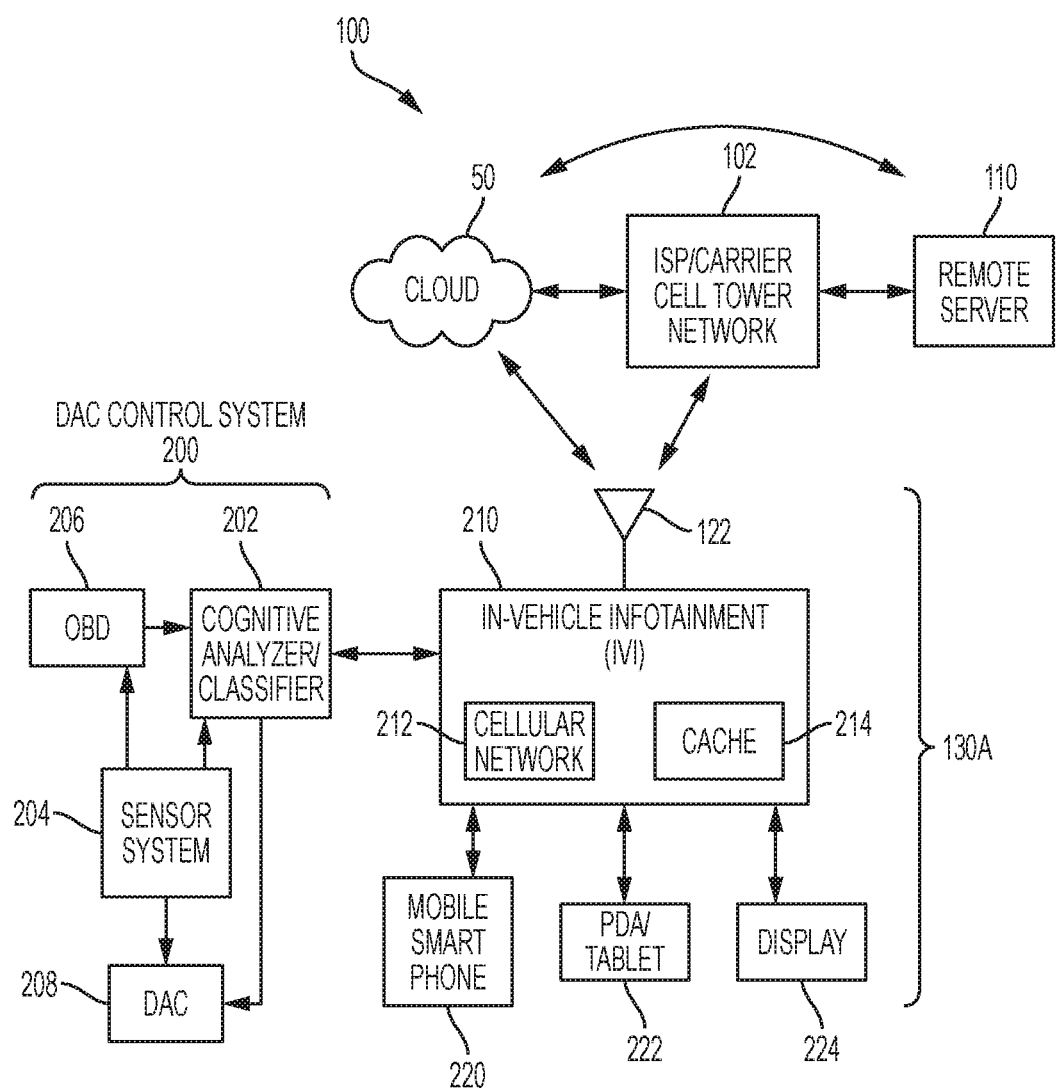
FIG. 2 depicts a block diagram of a system embodying aspects of the present invention.

FIG. 2 depicts a block diagram showing portions of system 100, along with vehicle electronics system 130A. Vehicle electronics system 130A provides additional details of how vehicle electronics system 130 (shown in FIG. 1) can be implemented according to embodiments of the invention. Vehicle electronics system 130A includes antenna system 122, a driver assistance component (DAC) control system 200, an In-Vehicle Infotainment (IVI) system 210 having a cellular network (e.g., 3G, 4G LTE, 5G, etc.) circuit/module 212 and cache memory 214, a mobile smartphone 220, a personal-digital-assistant (PDA)/tablet 222, and a display 224, configured and arranged as shown. DAC control system 200 includes a cognitive analyzer/classifier 202, an OBD system/module 206, a sensor system 204, and a DAC system 208, configured and arranged as shown.

Figure 3:
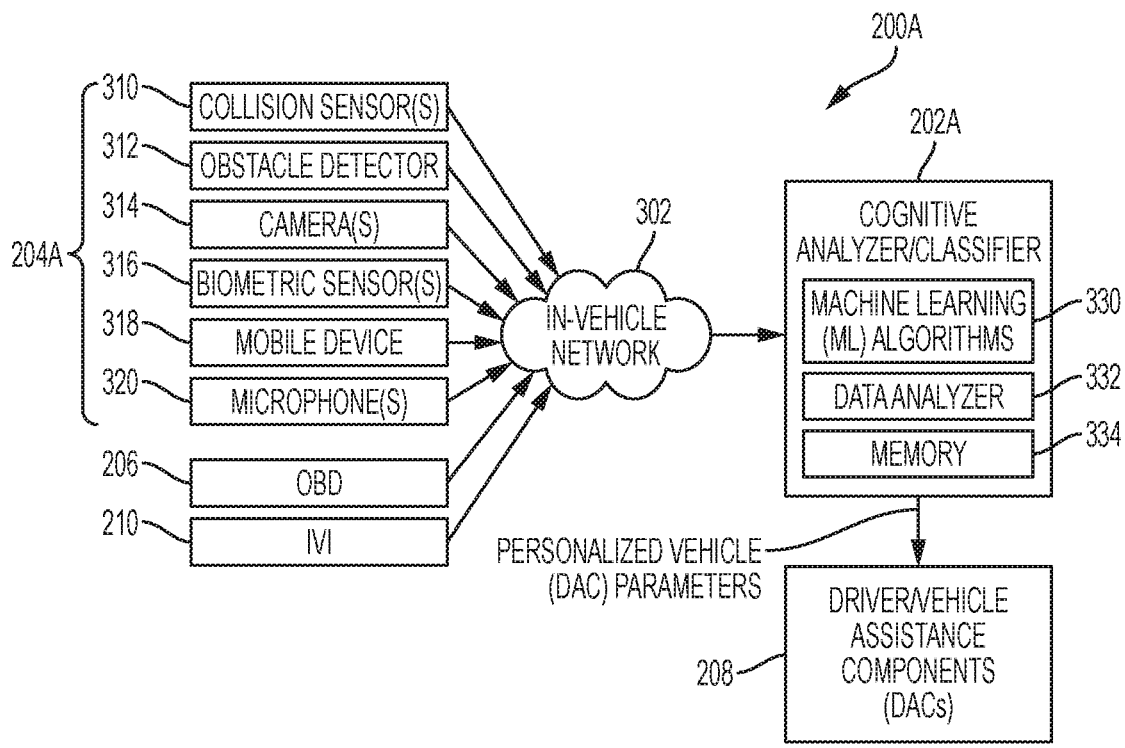
FIG. 3 depicts a block diagram of a system embodying aspects of the present invention.
Figure 4:
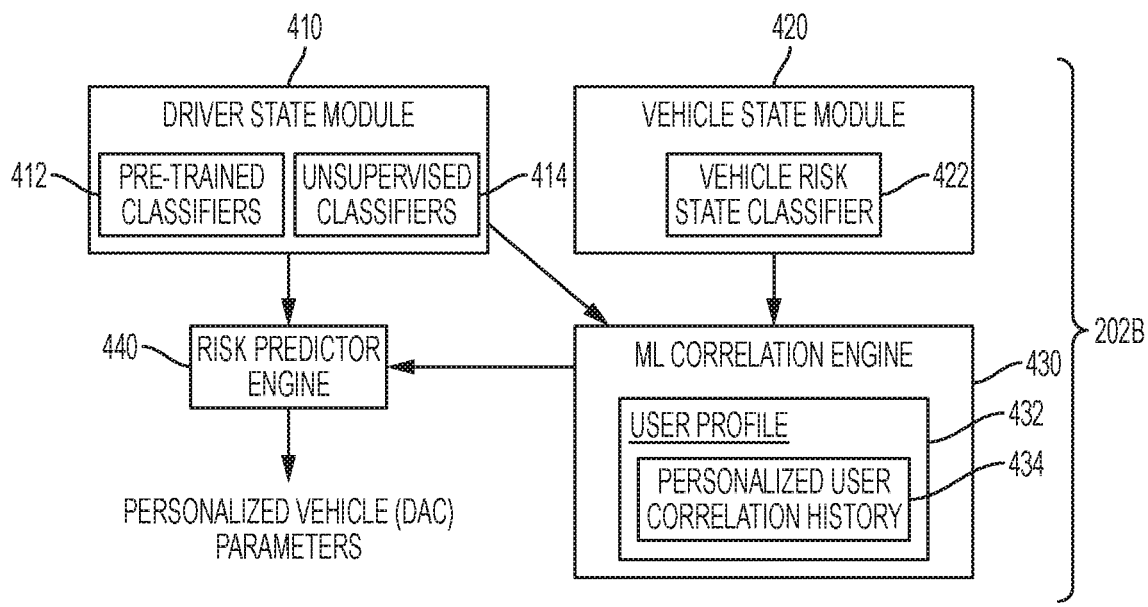
FIG. 4 depicts a block diagram of a system embodying aspects of the present invention.

DAC control system 200 provides methods, systems, and computer program products for the automatic and personalized adjustment of DAC system 208 according to embodiments of the invention. Additional details of how DAC control system 200 can be implemented according to embodiments of the invention are depicted by a DAC control system 200A and a cognitive analyzer/classifier 202B, which are shown in FIGS. 3 and 4, respectively, and which are and described in greater detail later in this detailed description.

DAC system 208 includes a system of components/modules designed to assist with various aspects of operating the vehicle 120 (shown in FIG. 1). Examples of DAC components include brake assist systems, forward-collision warning systems, automatic emergency braking systems, adaptive cruise control systems, blind-spot warning systems, rear cross-traffic alert systems, lane-departure warning systems, lane-keeping assist systems, pedestrian detection systems, and the like.

The OBD system 206 is a computer-based system that monitors various vehicle subsystems (e.g., the performance of major engine components of vehicle 120). A basic configuration for the OBD system 206 includes an ECU (not shown), which uses input from the sensor system 204 to control features of the vehicle 120 in order to reach the desired performance. Known OBD modules/systems can support hundreds of sensors that sense hundreds of parameters, which can be accessed via a diagnostic link connector (not shown) using a device called a scan tool (not shown). Accordingly, OBD system 206 and sensor system 204 cooperate to generate sensed operating data about how a particular driver has operated and driven the vehicle 120.

The sensor system 204, in accordance with embodiments of the invention, gathers sensed data that can be described in two general categories, namely, driver state sensed data and vehicle state sensed data. Driver state sensed data includes but is not limited to image data of the driver, audio data from within the passenger cabin, sensed data indicating activity from certain devices/components with which the driver can interface (e.g., mobile smartphone 220 is activated, grip on the steering wheel, IVI system 210 is playing a controversial talk radio program), and the like. Vehicle state sensed data includes but is not limited to data about the vehicle's route, duration of trips, number of times started/stopped, speed, speed of acceleration, speed of deceleration, use of cruise controls, the wear and tear on its components, and even road conditions and temperatures (engine and external). The sensors that form the sensor system 204 are chosen to provide the data needed to measure selected parameters. For example, an image capturing device is provided to capture images of the driver. Microphones are provided to capture audio in the passenger cabin of the vehicle 120 (shown in FIG. 1). Biometric sensors are provided to capture data from selected areas (e.g., the steering wheel) touched by the driver. Throttle positions sensors are provided to measure throttle position. G-analyst sensors are provided to measure g-forces.

In accordance with embodiments of the invention, IVI system 210 is configured to access the internet through cellular network 212 to communicatively couple the vehicle electronics system 130A to external systems such as the cloud computing system 50 and the remote server 110. Accordingly, the IVI system 210 can function as a gateway to allow external components such as cloud computing system 50 and/or remote server 110 to communicate with and support the DAC control system 200.

IVI system 200 is further configured to include sufficient circuitry (including, e.g., Bluetooth technology) to enable smartphones to help drivers/users control IVI system 210 with voice commands, touch-screen input, or physical controls. IVI system 210 also includes sufficient circuitry (e.g., cellular network circuit/module 212) to access, manage and play audio/video content; utilize GPS navigation for driving; utilize GPS navigation for identifying posted speed limits; deliver entertainment such as movies, games, social networking, etc.; provide incoming and send outgoing SMS text messages; make phone calls; and access internet-enabled or smartphone-enabled content such as traffic conditions, sports scores, weather forecasts and other streaming content. The display 224 can be a computer monitor, a liquid crystal display ("LCD") monitor, or any device capable of displaying data on a screen, paper, or other media.

The various components/modules of vehicle electronics 130A are depicted separately for ease of illustration and explanation. In embodiments of the invention, the functions performed by the various components/modules of vehicle electronics 130A can be distributed differently than shown. For example, the cognitive analyzer/classifier 202 of DAC control system 200 could be integrated in the IVI system 210.

Cloud computing system 50 is in wired or wireless electronic communication with one or all of IVI system 210, cellular network circuit/module 212, cache memory 214, DAC control system 200, mobile smartphone 220, PDA/tablet 222, and display 224. Cloud computing system 50 can supplement, support or replace some or all of the functionality of IVI system 210, cellular network circuit/module 212, cache memory 214, DAC control system 200, mobile smartphone 220, PDA/tablet 222, and display 224. Additionally, some or all of the functionality of IVI system 210, cellular network circuit/module 212, cache memory 214, DAC control system 200, mobile smartphone 220, PDA/tablet 222, and display 224 can be implemented as a node 10 (shown in FIG. 7) of cloud computing system 50.

FIG. 3 depicts a DAC control system 200A, which provides additional details of how the DAC control system 200 (shown in FIG. 2) can be implemented according to embodiments of the invention. The DAC control system 200A includes a cognitive analyzer/classifier 202A, the OBD system/module 206, a sensor system 204A, the IVI system 210, and the DAC system 208, configured and arranged as shown. The various components of the DAC control system 200A communicate with one another through the in-vehicle network 302. The in-vehicle network 302 uses in-vehicle networking (also known as multiplexing) to transfer data among the depicted distributed vehicle components via a serial data bus (not shown). In-vehicle network 302 enables the vehicle 120 (shown in FIG. 1) to be equipped with hundreds of computer-based electronic components and controls, including, for example, sensors, circuits, modules, components, and the like. Without serial networking, inter-module communication would require dedicated, point-to-point wiring, which would result in bulky, expensive, complex, and difficult to install wiring harnesses. Applying a serial data bus reduces the number of wires by combining the signals on a single wire through time division multiplexing. The sensor system 204A includes but is not limited to collision sensors 310, obstacle sensors 312, cameras 314, biometric sensors 316, a mobile device 318 (e.g., mobile smartphone 220 or PDA/tablet 222 shown in FIG. 2), microphones 320, and the like. The sensor system 204A can also include lane monitor sensors (not shown) for identifying the position of a vehicle within a particular lane, and more specifically for identifying when a vehicle is beginning to veer outside of its lane. The cognitive analyzer/classifier 202A includes machine learning (ML) algorithms 330, a data analyzer 332, and memory 334, configured and arranged as shown.

Exemplary operations of the DAC control system 200, 200A according to embodiments of the invention will now be described with reference to elements shown in FIGS. 2 and 3. The ML algorithms 330 of the cognitive analyzer classifier 202, 202A receive sensed data from the sensor system 204, 204A, the OBD system/module 206, and the IVI system 210. The sensed data includes a temporal component. For example, time stamp data can be captured for the sensed data to indicate the approximate start time, end time, and duration of classifications that will be derived for the sensed data. In accordance with embodiments of the invention, the ML algorithms 330 are configured and arranged to process sensed data in two general categories, namely, driver state sensed data and vehicle state sensed data. It is contemplated that some sensed data will have applicability to and be processed in both categories. Driver state sensed data includes but is not limited to image data of the driver, audio data from within the passenger cabin, sensed data indicating activity from certain devices/components with which the driver can interface (e.g., mobile smartphone 220 is activated, grip on the steering wheel, IVI system 210 is playing a controversial talk radio program), and the like. Vehicle state sensed data include but are not limited to data about the vehicle's route, duration of trips, number of times started/stopped, lane position, speed, speed of acceleration, speed of deceleration, use of cruise controls, the wear and tear on its components, and even road conditions and temperatures (engine and external). The sensors that form the sensor system 204 are chosen to provide the data needed to measure selected parameters. For example, an image capturing device is provided to capture images of the driver. Microphones are provided to capture audio in the passenger cabin of the vehicle 120 (shown in FIG. 1). Biometric sensors are provided to capture data from selected areas (e.g., the steering wheel) touched by the driver. Throttle positions sensors are provided to measure throttle position. G-analyst sensors are provided to measure g-forces.

The driver state sensed data is used as training data inputs to the ML algorithms 330. The ML algorithms 330 can include functionality that is necessary to interpret and utilize the outputs of the sensor system 204, 204A. For example, the ML algorithms 330 can be provided with visual recognition software to interpret image data captured by the cameras 314, or the ML algorithms 330 can be provided with voice detection software that can distinguish human speech from other background noise captured by the microphones 320.

The ML algorithms 330 are configured and arranged to apply machine learning techniques to the driver state sensed data in order to, over time, create/train/update a unique and personalized driver state model for each driver of the vehicle 120. For example, when the initial owner first starts and drives the vehicle 120, the DAC control system 200, 200A could utilize sensed driver state data from the sensor system 204, 204A (e.g., cameras 314) to detect a first-time driver and create a new profile (e.g., Driver A Profile) for the first-time driver. The initial owner, Driver A, drives the vehicle 120 home, and all driver sensed data during that trip is utilized to create/train/update a Driver A State Model for the Driver A Profile. The DAC control system 200, 200A is configured and arranged to only create/train/update a driver's model when the DAC control system 200, 200A has confirmed through the sensor system 204, 204A that the driver that the system 200, 200A has associated with the driver state model is operating the vehicle 120. Accordingly, for a family in which 4 people, namely Driver A, Driver B, Driver C, and Driver D, drive the vehicle 120, the ML algorithm 330 will create/train/update a separate, personalized, and individual driver state model for each of Driver A, Driver B, Driver, C, and Driver D.

The personalized driver state model(s), when sufficiently trained, can be used to classify new driver state sensed data into selected classification categories that provide desired information about the state of the person driving the vehicle 120 (shown in FIG. 1). For example, sensed driver state data showing elevated Driver A body temperature and/or heart rate could be classified by the ML algorithms 330 as indicating that Driver A is likely distracted or potentially not feeling well and not in his/her most alert state. As another example, the sensed driver state data could indicate that, for Driver A, certain movements indicate distraction, certain facial expressions indicate happiness or sadness, certain eye movement indicates whether Driver A is focused on the road, etc. As another example, the sensed driver state data could indicate that, for Driver A, when a cellular phone call is received from Driver A's office exchange when Driver A is driving home between 6 pm and 7 pm, Driver A becomes anxious and is less focused on the road. In some embodiments of the invention, the ML algorithm 330 can be provided with an initial set of driver state training data (e.g., a set of movements known to indicate distraction) for supervised learning. In some embodiments of the invention, no initial set of driver state training data is provided, and the ML algorithm 330 proceeds under an unsupervised learning regiment.

Because new sensed data into the ML algorithm 330 further trains/updates the relevant driver state model, the driver state model can automatically incorporate new patterns exhibited by the subject driver. For example, assume that Driver A attends a safe driving course that teaches not exceeding the posted speed limit reduces the likelihood of a traffic accident by 25%. Driver A decides to begin never exceeding the posted speed limit when he/she drives. After demonstrating this new driving pattern over a sufficient period of time, the ML algorithm 330 will adjust Driver A's model to incorporate the new pattern.

Similarly, the vehicle state sensed data is used as training data inputs to the ML algorithms 330. The ML algorithms 330 can include the functionality necessary to interpret and utilize the outputs of the sensor system 204, 204A. The ML algorithms 330 are configured and arranged to apply machine learning techniques to the vehicle state sensed data in order to, over time, create/train/update a unique and personalized vehicle state model for each driver of the vehicle 120. For example, when the initial owner first starts and drives the vehicle 120, the DAC control system 200, 200A could utilize sensed driver state data from the sensor system 204, 204A (e.g., cameras 314) to detect a first-time driver and create a new profile (e.g., Driver A Profile) for the first-time driver. The initial owner, Driver A, drives the vehicle 120 home, and all vehicle state sensed data during that trip is utilized to create/train/update a Driver A Vehicle State Model for the Driver A Profile. The DAC control system 200, 200A is configured and arranged to only create/train/update a driver's vehicle state model when the DAC control system 200, 200A has confirmed through the sensor system 204, 204A that the driver that has been associated with the particular driver model is operating the vehicle 120. Accordingly, for a family in which 4 people, namely Driver A, Driver B, Driver C, and Driver D, drive the vehicle 120, the ML algorithm 330 will create/train/update a separate, personalized, and individual vehicle state model for each of Driver A, Driver B, Driver, C, and Driver D. The personalized vehicle state model(s), when sufficiently trained, can be used to classify new vehicle state sensed data into classification categories that provide desired information about the state of the vehicle when a particular person is driving the vehicle 120 (shown in FIG. 1).

The personalized vehicle state model(s), when sufficiently trained, can be used to classify new vehicle state sensed data into selected classification categories that provide desired information about the state of the vehicle 120 when it is being driven by a particular person. For example, sensed vehicle state data can demonstrate that Driver A typically exceeds the posted speed limit by an average of 3 mile per hour, but when driving between 6 pm and 7 pm on weekdays, Driver A has periods when Driver A exceeds the posted speed limit by an average of 9 miles per hour, representing a 3 fold increase over Driver A's typical average. In embodiments of the invention, no initial set of vehicle state training data is provided, and the ML algorithm 330 proceeds under an unsupervised learning regiment. Because new sensed data into the ML algorithm 330 further trains/updates the relevant vehicle state model, the vehicle state model can automatically incorporate new driving patterns exhibited by the subject driver.

Data analyzer 332 receives driver state classification data from the driver state model of the ML algorithm 330. Data analyzer 332 also receives vehicle state classification data from the vehicle state model of the ML algorithm 330. Data Analyzer 332 also accumulates and stores in memory 334, for each driver, the historical correlations made by the data analyzer 332 between the driver state classifications and the vehicle state classifications (an example is shown in FIG. 6 and described in greater detail below). In embodiments of the invention, the data analyzer 332 is configured to use machine learning techniques to perform a correlation operation that correlates the driver state classifications, the vehicle state classifications, and the stored historical correlations. In embodiments of the invention, the data analyzer 332 temporally correlates the classified driver state data, the classified vehicle state data, and the stored historical correlations.

In embodiments of the invention, the data analyzer 332 is further configured to perform a prediction operation on the results of the correlation operation. In embodiments of the invention, the prediction operation includes constructing predictive features in order to predict what changes, if any, should be made to the DAC 208. In embodiments of the invention, the changes to the DAC 208 are in the form of setting new operating parameters for the DAC 208. According to embodiments of the present invention, because the various models and sensed state data were personalized for a particular driver, the new DAC operating parameters, if any, are also personalized for the particular driver. Examples of DAC operating parameters include but are not limited to increasing forward collision warning distance so the driver is warned sooner; automatic emergency breaking can be activated earlier; lane-departure warnings can be given sooner; and lane-keep assist functions can be made be less variable; pedestrian detection distances can be increased. In embodiments of the invention, temporary movements (e.g., driver changing the radio, looking over their shoulder to change lanes, etc.) could also be detected and operating parameters adjusted for the few brief moments that the driver is not looking at the road.

In embodiments of the invention, the DAC control system 200, 200A includes a DAC interface software module (not shown) that is configured to allow the DAC control system 200, 200A to access and reset the operating parameters of the various DAC components that make up the DAC system 208. In embodiments of the invention, the DAC control system 200, 200A is configured to be integrated as a retrofit component to an existing vehicle electronics system 130, 130A. In embodiments of the invention, the features of the DAC control system 200, 200A (specifically, cognitive analyzer/classifier 202/202A) can be integrated into the vehicle electronics system 130, 130A during manufacture thereof. In embodiments of the invention, the features of the DAC control system 200, 200A (specifically, cognitive analyzer/classifier 202/202A) can be integrated into a portable mobile device such as mobile smart phone 220 or PDA/tablet 222 (shown in FIG. 2). In embodiments of the invention, additional computing power can be provided by implementing the functionality of DAC control system 200, 200A and/or cognitive analyzer/classifier 202, 202A, 202B at the remote server 110 (shown in FIGS. 1 and 2) or cloud computing system 50. In embodiments of the invention, a centralized computing facility employing IBM Watson technologies at remote server 110 or cloud computing system 50 can be utilized to make better predictions and train a larger body of correlated user and risk data.

FIG. 6 depicts a table 600 illustrating examples of stored historical temporal correlations between classified driver state model outputs and changes in the pattern of classified vehicle state model outputs for Drivers A, B, C, D according to embodiments of the present invention. As shown in FIG. 6, Driver B is unflappable and demonstrates no meaningful changes in driving pattern, whereas when classified driver state data indicates that data Driver A's grip on the wheel has tightened above a predetermined threshold, an active phone call is taking place over the mobile smart phone 220, 318, Driver A's mood is "angry", or a conversation with a passenger is likely taking place because multiple non-radio voices have been detected, Driver A exhibits alterations from their usual driving pattern. Drivers A, C, and D each demonstrate a different driving pattern response when the driver's grip tightens on the wheel. Specifically, Driver A's average driving speed increases, Driver C's average driving speed decreases, and Driver D's lane position becomes unstable.

In embodiments of the invention, the table 600 depicted in FIG. 6 can be implemented as a relational database that is located in memory 334 or any other storage location of the vehicle electronics system 130, 130A, mobile device 220, 318, remote server 110, or cloud computing system 50. In general, a database is a means of storing information in such a way that information can be retrieved from it. A relational database presents information in tables with rows and columns. A table is referred to as a relation in the sense that it is a collection of objects of the same type (rows). Data in a table can be related according to common keys or concepts, and the ability to retrieve related data from a table is the basis for the term relational database. A database management system (DBMS) handles the way data is stored, maintained, and retrieved. In the case of a relational database, a relational database management system (RDBMS) performs these tasks.

FIG. 4 depicts a cognitive analyzer/classifier 202B that is a more detailed example of how cognitive analyzer/classifier 202A (shown in FIG. 3) can be implemented according to embodiments of the invention. Cognitive analyzer/classifier 202B operates similarly to cognitive analyzer 202A shown in FIG. 3 which is described in greater detail above. Accordingly, the previous description of how cognitive analyzer/classifier 202A operates applies equally to cognitive analyzer/classifier 202B so only the specific additional details of the cognitive analyzer/classifier 202B shown in FIG. 4 will be described here.

As shown, cognitive analyzer/classifier 202B includes a driver state module 410, a vehicle state module 420, a ML correlation engine 430, and a risk predictor engine 440, configured and arranged as shown. Driver state module 410 can, in some embodiments of the invention, include pre-trained classifiers 412 and unsupervised classifiers 414. In some embodiments of the invention, either one, both or neither of the classifiers 412, 414 can be pre-trained. In some embodiments of the invention, either one, both or neither of the classifiers 412, 414 can be unsupervised. Vehicle state module 420 includes a vehicle risk state classifier 422. ML correlation engine 430 includes a user profile 432, and user profile 432 includes a personalized user correlation history 434.

In embodiments of the invention, the driver state module 410, vehicle state module 420, and the ML correlation engine 430 can be implemented as machine learning algorithms or classifiers configured and arranged to classify data. Examples of suitable classifiers include but are not limited to neural networks, support vector machines (SVMs), logistic regression, decision trees, hidden Markov Models (HMMs), etc. The end result of the classifier's operations, i.e., the "classification," is to predict a class for the data. For example, predicting the driver's mood (angry, distracted, focused, sad, excited) based on data showing that driver's hand wave in the air in a manner that might have been a hostile gesture, or that might have been an animated response to a favorite song playing on the radio.

In embodiments of the invention, a particular type of classier is selected based on the type of data (temporal, spatial, text, etc.). For temporal data involving recognizing a person's movements, Hidden Markov Models, Dynamic Probabilistic Networks, or Naive Bayes are suitable methods. In embodiments of the invention, because different types of data (e.g. eye position, vehicle proximity, body movements, audio, etc.) are being analyzed, different classifier methods are employed.

Once the type of classifier is selected, the classifier extracts features from the data being analyzed. In embodiments of the invention, the data is in the form of voltage signals that can be converted into a number that the selected classifier can use. For example, distance readings from the obstacle detectors 312 (shown in FIG. 3) can be converted to several labels: <1 ft; 1-2 ft; 2-3 ft; 4-6 ft; 6-8 ft; 8-16 ft; and the like. The classifier then creates a model from the training data, and the model is used to classify new data.

In embodiments of the invention, the driver state module 410 uses a combination of pre-trained (or supervised) classifiers 412 and unsupervised classifiers 414. Pre-trained classifier 412 conducts supervised learning, wherein some classified/labeled training data are provided. Unsupervised classifiers 414 conduct unsupervised learning, wherein classified/labeled training data is not provided. Unsupervised learning methods include but are not limited to clustering, anomaly detection, neural networks, deep learning, and the like. Accordingly, embodiments of the invention selectively utilize multiple classification (or machine learning) methods in combination. For example, in embodiments of the invention, the driver state module 410 can use pre-trained (i.e., supervised) classifiers 412 to classify, for example, facial expressions, gestures, conversations, device activity and the like. The driver state module 410 can use unsupervised classifiers 414 to classify, for example, eye position, along with the anomaly rate of eye movements, body movements, facial expressions, and the like. The vehicle state module 420 can use the vehicle risk classifier 422, which can be supervised or unsupervised, to classify, for example, distance to other cars and distance to obstacles, along with the anomaly rate of acceleration (pedal), acceleration (turning), lane position, and the like. The sensor data from the vehicle state module 420, such as the rate of anomalies in lane position, the distance to other cars, the car acceleration while turning, etc. is combined to create a perceived risk.

ML correlation engine 430 is unsupervised and receives the classified outputs of the pre-trained classifiers 412, the unsupervised classifiers 414, and the vehicle risk state classifier 422. According to embodiments of the invention, because the ML correlation engine 430 creates a larger and unsupervised model, the ML correlation engine constantly feeds back into itself to better correlate the classified predictions with the vehicle sensor readings. The ML correlation engine 430 correlates all of the classified data received therein and stores this to a user/driver profile 432 which has historic information 434 on the user/driver risk state correlated with the user/driver state (e.g., see table 600 shown in FIG. 6). Along with updating the user history model 434, the ML correlation engine 430 feeds the risk predictor engine 440 with the current user/driver state to predict a predicted potential risk for the user/driver at the current time. This predicted potential risk is used to adjust the safety parameters of the DAC 208 (shown in FIGS. 2 and 3) using a personalized vehicle/DAC parameter.

FIG. 5 depicts a flow diagram illustrating a methodology 500 according to embodiments of the present invention. The methodology 500 depicted in FIG. 5 can be performed using the DAC control systems 200, 200A shown in FIGS. 2 and 3, as well as the cognitive analyzer/classifier 202B shown in FIG. 4. The functionality depicted by methodology 500 is primarily performed by the cognitive analyzer/classifier 200, 200A, 200B. The methodology 500 begins at block 502 by accessing training data/sensor readings, which are provided to block 504 and block 506. Block 504 uses sensor readings/training data and machine learning to create/train/update a driver state model. Block 508 uses the current driver state model to classify sensor readings. Block 506 uses sensor readings/training and machine learning to create/train/update the vehicle risk state model. Block 510 uses the vehicle risk state model to classify sensor readings. Block 512 correlates the driver state classifications, the vehicle risk state classifications and the personalized user correlation history. Block 512 updates a database 520 that holds the personalized user correlation histories. Block 512 also performs a risk prediction operation on the current user/driver state against the results of the correlation to predict a predicted potential risk for the user/driver at the current time. This predicted potential risk is used to adjust the safety parameters of the DAC 208 (shown in FIGS. 2 and 3) using a personalized vehicle/DAC parameter.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
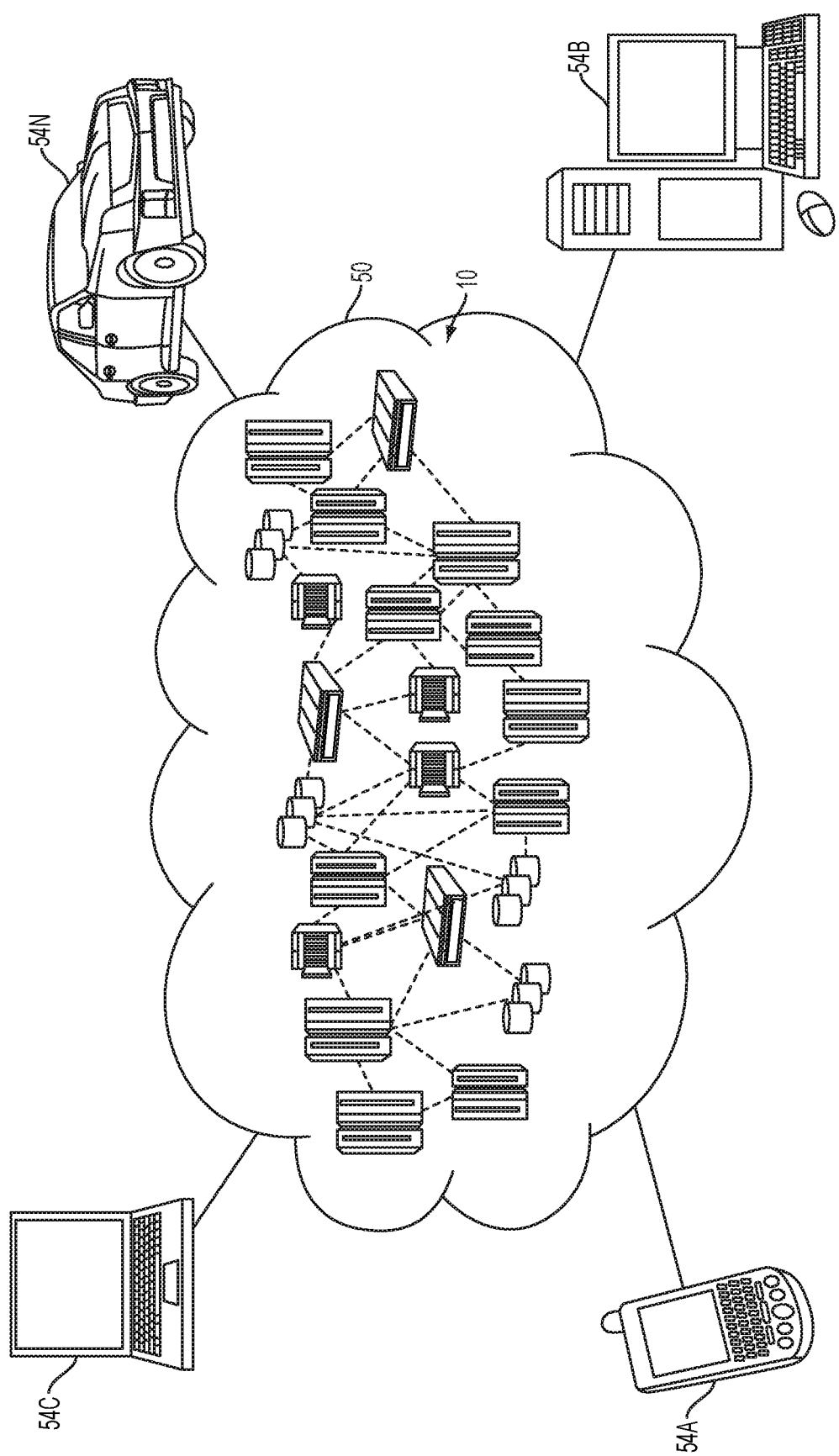
FIG. 7 depicts a cloud computing environment according to embodiments of the present invention.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
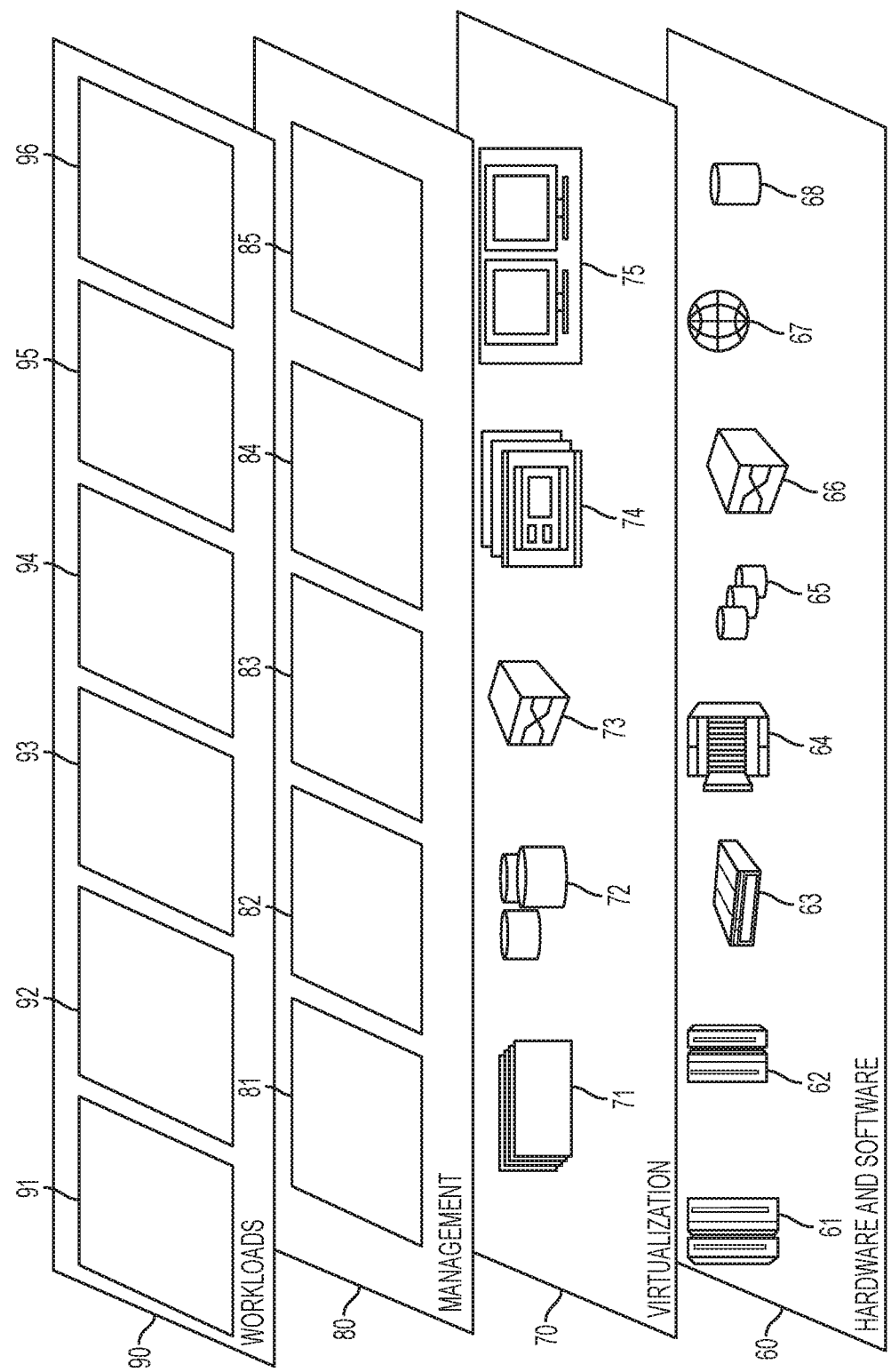
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and the automatic and personalized adjustment of driver assistance components of a vehicle 96.

Figure 9:
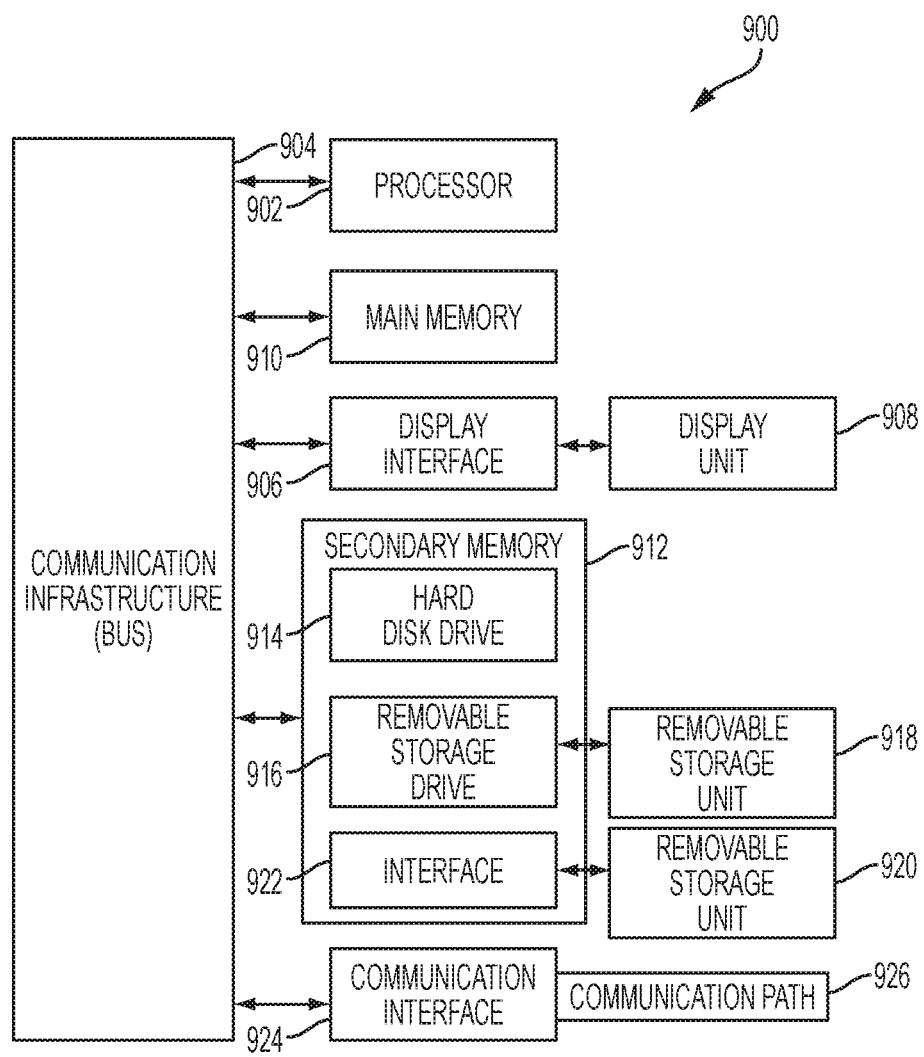
FIG. 9 depicts details of an exemplary computing system capable of implementing aspects of the present invention.

FIG. 9 depicts a high level block diagram computer system 900, which can be used to implement one or more aspects of the present invention. More specifically, computer system 900 can be used to implement some hardware components of embodiments of the present invention. Although one exemplary computer system 900 is shown, computer system 900 includes a communication path 926, which connects computer system 900 to additional systems (not depicted) and can include one or more wide area networks (WANs) and/or local area networks (LANs) such as the Internet, intranet(s), and/or wireless communication network(s). Computer system 900 and additional system are in communication via communication path 926, e.g., to communicate data between them.

Computer system 900 includes one or more processors, such as processor 902. Processor 902 is connected to a communication infrastructure 904 (e.g., a communications bus, cross-over bar, or network). Computer system 900 can include a display interface 906 that forwards graphics, text, and other data from communication infrastructure 904 (or from a frame buffer not shown) for display on a display unit 908. Computer system 900 also includes a main memory 910, preferably random access memory (RAM), and can also include a secondary memory 912. Secondary memory 912 can include, for example, a hard disk drive 914 and/or a removable storage drive 916, representing, for example, a floppy disk drive, a magnetic tape drive, or an optical disk drive. Removable storage drive 916 reads from and/or writes to a removable storage unit 918 in a manner well known to those having ordinary skill in the art. Removable storage unit 918 represents, for example, a floppy disk, a compact disc, a magnetic tape, or an optical disk, etc. which is read by and written to by removable storage drive 916. As will be appreciated, removable storage unit 918 includes a computer readable medium having stored therein computer software and/or data.

In alternative embodiments, secondary memory 912 can include other similar means for allowing computer programs or other instructions to be loaded into the computer system. Such means can include, for example, a removable storage unit 920 and an interface 922. Examples of such means can include a program package and package interface (such as that found in video game devices), a removable memory chip (such as an EPROM, or PROM) and associated socket, and other removable storage units 920 and interfaces 922 which allow software and data to be transferred from the removable storage unit 920 to computer system 900.

Computer system 900 can also include a communications interface 924. Communications interface 924 allows software and data to be transferred between the computer system and external devices. Examples of communications interface 924 can include a modem, a network interface (such as an Ethernet card), a communications port, or a PCM-CIA slot and card, etcetera. Software and data transferred via communications interface 924 are in the form of signals which can be, for example, electronic, electromagnetic, optical, or other signals capable of being received by communications interface 924. These signals are provided to communications interface 924 via communication path (i.e., channel) 926. Communication path 926 carries signals and can be implemented using wire or cable, fiber optics, a phone line, a cellular phone link, an RF link, and/or other communications channels.

In the present description, the terms "computer program medium," "computer usable medium," and "computer readable medium" are used to generally refer to media such as main memory 910 and secondary memory 912, removable storage drive 916, and a hard disk installed in hard disk drive 914. Computer programs (also called computer control logic) are stored in main memory 910 and/or secondary memory 912. Computer programs can also be received via communications interface 924. Such computer programs, when run, enable the computer system to perform the features of the present invention as discussed herein. In particular, the computer programs, when run, enable processor 902 to perform the features of the computer system. Accordingly, such computer programs represent controllers of the computer system.

Many of the functional units described in this specification have been labeled as modules. Embodiments of the present invention apply to a wide variety of module implementations. For example, a module can be implemented as a hardware circuit comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together, but can include disparate instructions stored in different locations which, when joined logically together, comprise the module and achieve the stated purpose for the module.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It will be understood that those skilled in the art, both now and in the future, may make various improvements and enhancements which fall within the scope of the claims which follow.

What is claimed is:

1. A computer-implemented method of operating a driver assistance component (DAC) of a vehicle, the method comprising:
receiving, using a sensor system, sensed operator state data that represents an operator state of a vehicle operator in an interior passenger cabin of the vehicle, wherein the sensed operator state data is gathered only when the vehicle is being operated by the operator;
receiving, using the sensor system, sensed vehicle state data that represents a vehicle state of the vehicle, wherein the sensed vehicle state data is gathered only when the vehicle is being operated by the operator;
based at least in part on the sensed operator state data, using a first classifier to create, train, and update an operator state model, wherein the operator state model comprises a model of the operator's state when the vehicle is being operated by the operator;
based at least in part on the sensed vehicle state data, using a second classifier to create, train, and update a vehicle state model, wherein the vehicle state model comprises a model of the vehicle's state when the vehicle is being operated by the operator;
based at least in part on new sensed operator state data, wherein the new sensed operator state data comprises the sensed operator state data received by the sensor system subsequent to a first training period, generating, using the first classifier and the operator state model, an operator state model classification output;
based at least in part on new sensed vehicle state data, wherein the new sensed vehicle state data comprises the sensed vehicle state data received by the sensor system subsequent to a second training period, generating, using the second classifier and the vehicle state model, a vehicle state model classification output;
correlating, using a correlation engine, the operator state model classification output and the vehicle state model classification output; and
based at least in part on the operator state model classification output and the vehicle state model classification output, predicting, using a predictor engine, operator parameters for the DAC of the vehicle;
wherein using the first classifier to train the operator state model comprises:
using a first segment of the first classifier to perform training on a first model using a first set of the sensed operator state data; and
using a second segment of the first classifier to perform training on a second model using a second set of the sensed operator state data.

2. The computer-implemented method of claim 1 further comprising:
generating, using the predictor engine, a personalized correlation history comprising previous correlations between historical operator state model classification outputs and historical vehicle state model classification outputs;
wherein the previous correlations between historical operator state model classification outputs and historical vehicle state model classification outputs were generated based on the operator operating the vehicle.

3. The computer-implemented method of claim 2 further comprising correlating, using the correlation engine, the operator state model classification output, the vehicle state model classification output, and the personalized correlation history.

4. The computer-implemented method of claim 2 further comprising updating, using the correlation engine, the personalized correlation history.

5. The computer-implemented method of claim 1 further comprising using the correlation engine to apply training to the operator state model classification output and the vehicle state model classification output.

6. The computer-implemented method of claim 2 further comprising using the correlation engine to apply training to the operator state model classification output, the vehicle state model classification output, and the personalized correlation history.

7. A computer system for operating a driver assistance component (DAC) of a vehicle, the system comprising:
a memory system; and
a processor system communicatively coupled to the memory system, wherein the processor system includes a first classifier, a second classifier, and a correlation engine, wherein the processor system and the memory system are configured to perform a method comprising:
receiving, from a sensor system, sensed operator state data that represents an operator state of a vehicle operator in an interior passenger cabin of the vehicle, wherein the sensed operator state data is gathered only when the vehicle is being operated by the operator;
receiving, from the sensor system, sensed vehicle state data that represents a vehicle state of the vehicle, wherein the sensed vehicle state data is gathered only when the vehicle is being operated by the operator;
based at least in part on the sensed operator state data, using the first classifier to create, train, and update an operator state model, wherein the operator state model comprises a model of the operator's state when the vehicle is being operated by the operator;
based at least in part on the sensed vehicle state data, using the second classifier to create, train, and update a vehicle state model, wherein the vehicle state model comprises a model of the vehicle's state when the vehicle is being operated by the operator;
based at least in part on new sensed operator state data, wherein the new sensed operator state data comprises the sensed operator state data received by the sensor system subsequent to a first training period, generating, using the first classifier and the operator state model, an operator state model classification output;
based at least in part on new sensed vehicle state data, wherein the new sensed vehicle state data comprises the sensed vehicle state data received by the sensor system subsequent to a second training period, generating, using the second classifier and the vehicle state model, a vehicle state model classification output;
correlating, using a correlation engine, the operator state model classification output and the vehicle state model classification output; and
based at least in part on the operator state model classification output and the vehicle state model classification output, predicting, using a predictor engine, operator parameters for the DAC of the vehicle;
wherein the first classifier is segmented to comprise a first segment and a second segment;
wherein the first segment is configured to use a first set of the sensed operator state data to perform training on a first model; and wherein the second segment is configured to use a second set of the sensed operator state data to perform training on a second model.

8. The computer system of claim 7 further comprising:
generating, using the predictor engine, a personalized correlation history comprising previous correlations between historical operator state model classification outputs and historical vehicle state model classification outputs;
wherein the previous correlations between historical operator state model classification outputs and historical vehicle state model classification outputs were generated based on the operator operating the vehicle.

9. The computer system of claim 8 further comprising correlating, using the correlation engine, the operator state model classification output, the vehicle state model classification output, and the personalized correlation history.

10. The computer system of claim 8 further comprising updating, using the correlation engine, the personalized correlation history.

11. The computer system of claim 7, wherein the correlation engine is configured to apply training to the operator state model classification output and the vehicle state model classification output.

12. The computer system of claim 8, wherein the correlation engine is configured to apply training to the operator state model classification output, the vehicle state model classification output, and the personalized correlation history.

13. A computer program product for operating a driver assistance component (DAC) of a vehicle, the computer program product comprising:
a computer readable storage medium having program instructions embodied therewith, wherein the program instructions are readable by a processor system comprising a first classifier, a second classifier, and a correlation engine, wherein the program instructions are readable by the processor system to cause the processor system to perform a method comprising:
receiving, from a sensor system, sensed operator state data that represents an operator state of a vehicle operator in an interior passenger cabin of the vehicle, wherein the sensed operator state data is gathered only when the vehicle is being operated by the operator;
receiving, from the sensor system, sensed vehicle state data that represents a vehicle state of the vehicle, wherein the sensed vehicle state data is gathered only when the vehicle is being operated by the operator;
based at least in part on the sensed operator state data, using the first classifier to create, train, and update an operator state model, wherein the operator state model comprises a model of the operator's state when the vehicle is being operated by the operator;
based at least in part on the sensed vehicle state data, using the second classifier to create, train, and update a vehicle state model, wherein the vehicle state model comprises a model of the vehicle's state when the vehicle is being operated by the operator;
based at least in part on new sensed operator state data, wherein the new sensed operator state data comprises the sensed operator state data received by the sensor system subsequent to a first training period, generating, using the first classifier and the operator state model, an operator state model classification output;
based at least in part on new sensed vehicle state data, wherein the new sensed vehicle state data comprises the sensed vehicle state data received by the sensor system subsequent to a second training period, generating, using the second classifier and the vehicle state model, a vehicle state model classification output;
correlating, using a correlation engine, the operator state model classification output and the vehicle state model classification output; and
based at least in part on the operator state model classification output and the vehicle state model classification output, predicting, using a predictor engine, operator parameters for the DAC of the vehicle;
wherein the first classifier is segmented to comprise a first segment and a second segment;
wherein the first segment is configured to use a first set of the sensed operator state data to perform training on a first model; and
wherein the second segment is configured to use a second set of the sensed operator state data to perform training on a second model.

14. The computer program product of claim 13 further comprising:
generating, using the predictor engine, a personalized correlation history comprising previous correlations between historical operator state model classification outputs and historical vehicle state model classification outputs;
wherein the previous correlations between historical operator state model classification outputs and historical vehicle state model classification outputs were generated based on the operator operating the vehicle.

15. The computer program product of claim 14 further comprising correlating, using the correlation engine, the operator state model classification output, the vehicle state model classification output, and the personalized correlation history.

16. The computer program product of claim 14 further comprising updating, using the correlation engine, the personalized correlation history.

17. The computer program product of claim 13 further comprising using the correlation engine is configured to
apply training to the operator state model classification output, the vehicle state model classification output, and the personalized correlation history.

* * * * *